US012268194B2

United States Patent
Farrar et al.

(10) Patent No.: US 12,268,194 B2
(45) Date of Patent: Apr. 8, 2025

(54) MULTI-PURPOSE COLLAR/WRAP-AROUND LEASH WITH ACCESSORY ATTACHMENT POINTS

(71) Applicant: Circle 3 Creative, LLC, Bozeman, MT (US)

(72) Inventors: Tim Farrar, Bozeman, MT (US); Jeff Vermillion, Bozeman, MT (US)

(73) Assignee: Circle 3 Creative, LLC, Bozeman, MT (US)

( * ) Notice: Subject to any disclaimer, the term of this patent is extended or adjusted under 35 U.S.C. 154(b) by 457 days.

(21) Appl. No.: 17/510,303

(22) Filed: Oct. 25, 2021

(65) Prior Publication Data

US 2022/0125018 A1    Apr. 28, 2022

Related U.S. Application Data

(60) Provisional application No. 63/105,097, filed on Oct. 23, 2020.

(51) Int. Cl.
*A01K 27/00* (2006.01)

(52) U.S. Cl.
CPC .......... *A01K 27/004* (2013.01); *A01K 27/001* (2013.01)

(58) Field of Classification Search
CPC .... A01K 27/00; A01K 27/001; A01K 27/003; A01K 27/002; A44B 11/00; A44B 11/25
See application file for complete search history.

(56) References Cited

U.S. PATENT DOCUMENTS

| 4,443,916 A * | 4/1984 | Tiemann | A44B 11/25 24/664 |
| 9,332,734 B1 * | 5/2016 | Hege | A01K 13/006 |
| 2012/0260865 A1 * | 10/2012 | Nesper | A01K 27/003 119/797 |

FOREIGN PATENT DOCUMENTS

| CA | 2982322 A1 * | 4/2018 | ........... A01K 27/001 |
| DE | 102016125464 B4 * | 10/2018 | ........... A01K 27/001 |
| EP | 0590206 A1 * | 4/1994 | ............. A44B 11/25 |
| GB | 980863 A * | 1/1965 | ........... A01K 27/005 |

* cited by examiner

*Primary Examiner* — Kristen C Hayes
(74) *Attorney, Agent, or Firm* — Aka Chan LLP

(57) ABSTRACT

An incorporated leash/collar is improved with the leash/collar strap. With a minimally stretchable strap, a buckle slides forms an adjustable collar with a first end of the strap. A metal buckle attached to the second end of the strap has a flat body with an opening. An adjustable position element has a post to engage the buckle body opening from either sides of the flat body. The first side engagement forms a leash handle loop in an operative configuration and the second side engagement maintain a wrap of the strap around the collar in a storage configuration. The incorporated leash/collar is also improved with a stretchable strap.

10 Claims, 20 Drawing Sheets

MULTI-PURPOSE COLLAR/WRAP-AROUND LEASH WITH ACCESSORY ATTACHMENT POINTS

CROSS-REFERENCE TO RELATED APPLICATIONS

This patent application claims priority to U.S. Provisional Patent Application No. 63/105,097, entitled "Improved Multi-Purpose Collar/Wrap-Around Leash with Accessory Attachment Points," filed Oct. 23, 2020, which is incorporated by reference herein.

BACKGROUND OF THE INVENTION

This invention relates to animal collars and leashes, particularly collars and leashes for dogs.

Existing dog collars typically have locations for pet identification and owner contact information, and provide an attachment point for leashes, harnesses or similar restraining accessories. A new leash/collar by one of the current inventors incorporates the leash and collar into one continuous piece to allow a leash portion to be wrapped and stored around the dog collar portion, or released from the dog collar to form a handled leash. See U.S. Pat. No. 10,390,519, entitled, "Animal Restraint Device," which issued Aug. 27, 2019 to Tim Farrar (hereafter "'519 patent"); and U.S. Design Pat. No. D844,907, entitled, "Combination Collar and Leash for an Animal," which issued Apr. 2, 2019 to Tim Farrar.

FIGS. 1A and 1B from the '519 patent show the incorporated leash/collar in an operative configuration and a storage configuration respectively. In FIG. 1A (FIG. 2 of the '519 patent) the collar of the leash/collar is wrapped around the neck of the animal, typically a dog, and the loop handle held in the hand of the owner while the leash section extends between the collar and loop handle. Neither the animal nor the owner is shown in the drawing. In FIG. 1B (FIG. 5 of the '519 patent) the leash/collar is in storage configuration with the balance of the leash/collar is wrapped around the collar on the neck of a dog. The leash/collar can also stored in the same configuration without the animal. Buckles are used for formation of the collar and loop handle, and hook-and-loop fasteners are used to secure the leash/collar in the storage configuration.

The current invention provides improvements to the strength, security, and convenience for the incorporated leash/collar.

BRIEF SUMMARY OF THE INVENTION

The present invention provides for an improved incorporated leash/collar. The improved incorporated leash/collar has a strap of a minimal stretchable material; a buckle slide attached to a first end of the strap, the buckle slide engaging the strap to form collar with the strap; a metal buckle attached to a second end of the strap, the buckle having a flat body with first and second sides, and an opening through the first and second sides; and an adjustable position element having slotted openings to attach the element to the strap at a position adjustable between the buckle slide and the buckle, the element having a post to engage the opening of the buckle body from both first and second sides, the first side to form a leash handle loop in an operative configuration and the second side to maintain a wrap of the strap around the collar in a storage configuration.

The present invention also provides for an improved incorporated leash/collar. The improved incorporated leash/collar has a strap of stretchable material, the strap having a plurality of holes along the strap; a first assembly having a first flat body attached a first end of the strap, a stud extending from the first flat body, a guide hoop extending from and over the flat body and displaced from the stud, the first assembly forming an adjustable collar from a loop at the first end of the strap, the stud engaging a selected hole of the strap and the guide hoop receiving and holding the strap against the first body to keep the stud securely engaged with the hole; and a second assembly having a second flat body attached to a second end of the strap, a hook extending from the second body to engage a selected one of the holes in the strap to form a leash handle loop in an operative configuration and to engage a selected other of the holes in the strap side to maintain a wrap of the strap around the collar in a storage configuration. The present invention further provides for an accessory for attachment to the improved incorporated leash/collar which has an accessory item, such as dog tag, capture magnet, flash light, GPS tracking module, or hand multi-tool; and one or more studs modified to securely attach the accessory item to the strap through one or more holes of the strap.

Other objects, features, and advantages of the present invention will become apparent upon consideration of the following detailed description and the accompanying drawings, in which like reference designations represent like features throughout the figures.

DETAILED DESCRIPTION OF THE INVENTION

The incorporated leash/collar of the '519 patent has a strap which is part of the leash collar at one end, part of the leash loop handle at a second end and the intervening leash between the collar and the loop handle. In these improvements of the incorporated leash/collar the leash/collar strap is formed with different characteristics. In one embodiment of the present invention the leash/collar strap is constructed with a minimal stretch material, such as a webbing weave of artificial fibers or natural fibers. Depending upon the fibers and the weave, the leash/collar strap can made non-stretchable, or with minimal stretch. Leather can also be used if the dimensions of the leash/collar strap and the particular leather skin provides for a minimal stretch.

With the strap of minimal stretch, an improved incorporated leash/collar is provided with a non-internal low-profile buckle slide attached at one end of the leash/collar strap, a flat end buckle attached to the other end of the collar/leash strap, and an adjustable receiver element on the leash/collar strap between the two buckles.

Figure 1A:
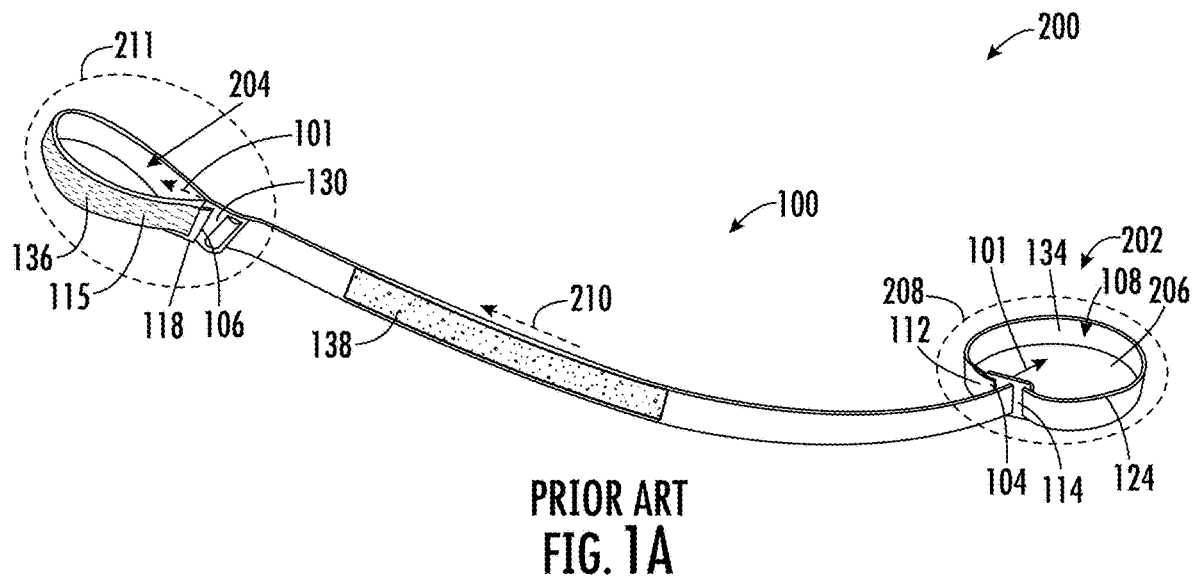
FIG. 1A shows an incorporated leash/collar in an operative configuration.
Figure 1B:
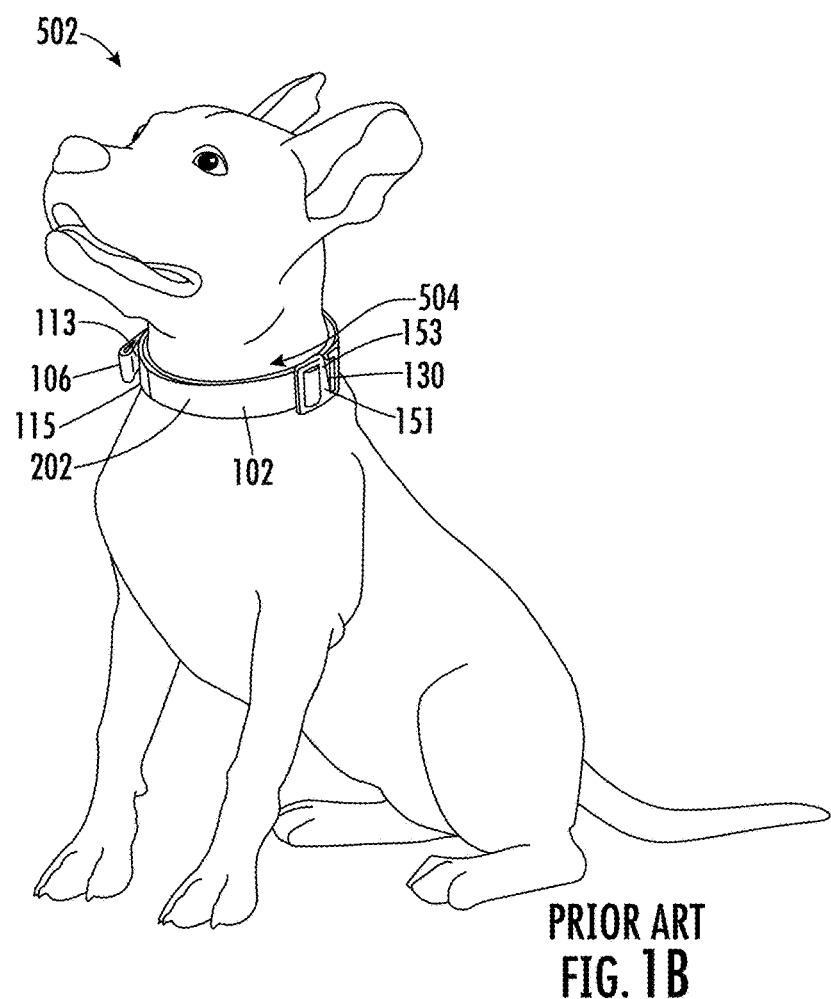
FIG. 1B illustrates the FIG. 1A incorporated leash/collar in a stored configuration.
Figure 2:
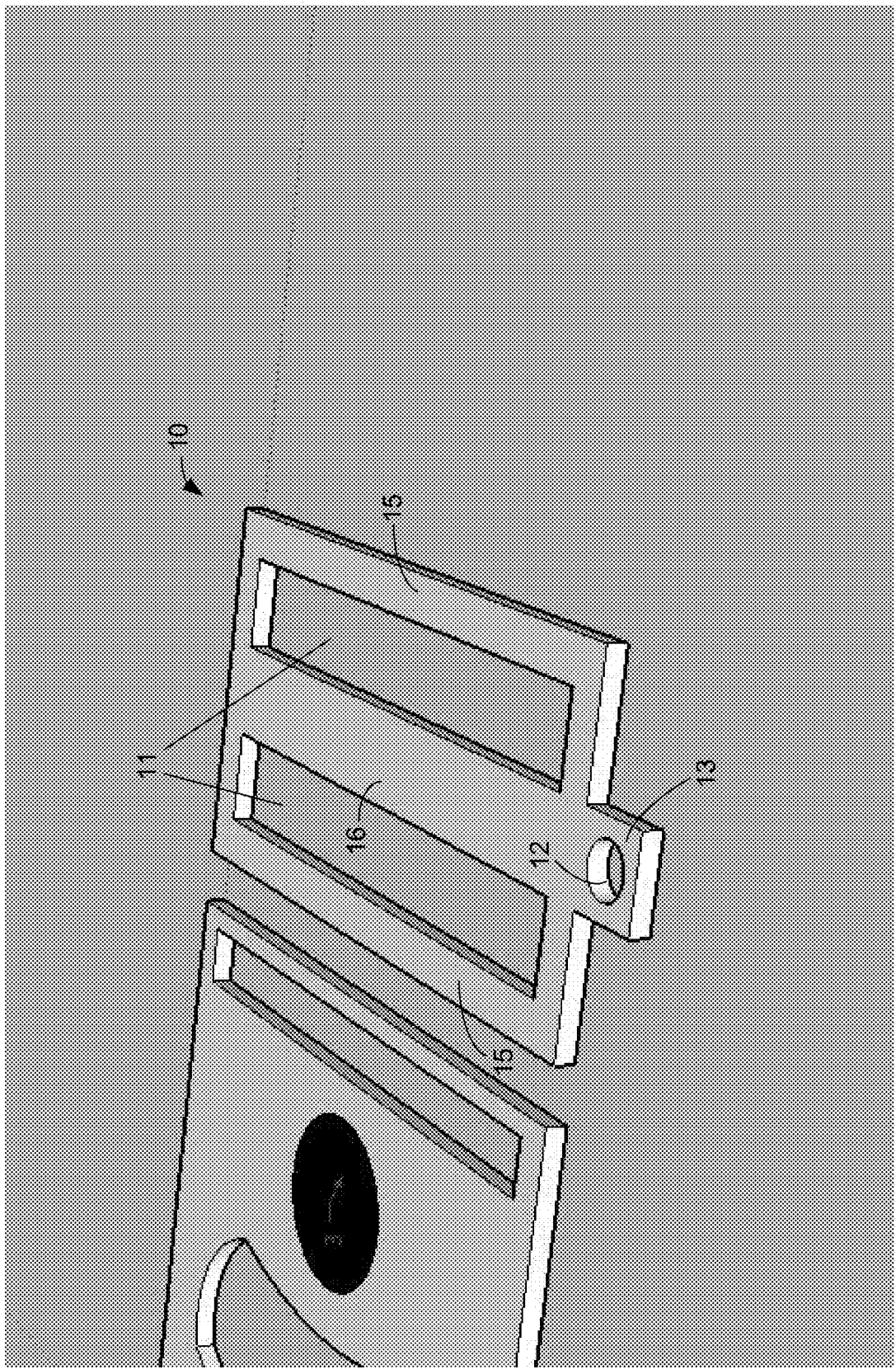
FIG. 2 shows a perspective view of an internal low profile buckle slide of an improved incorporated leash/collar according to one embodiment of the present invention.

FIGS. 2-5B illustrate the components of such an improved incorporated leash/collar. FIG. 2 illustrates a non-internal low-profile buckle slide 10, preferably made of metal, though a strong anti-wear material, such as certain plastics or reinforced carbon, might be used. A frame 14 of the buckle slide 10 has a post 16 separating two openings 11 at the two ends 15 of the buckle slide 10. The openings 11 are slotted and shaped to engage the webbing material of the leash/collar strap. One end (the animal or bitter end) of the leash/collar strap is attached to an end 15 of the buckle slide 10 by simply gluing or fusing the end of the leash/collar strap to the end 15 or looping the leash/collar strap end though the appropriate opening 11 and around the buckle slide end 15, and fixing the strap end back to the leash/collar strap.

To form the base collar around the neck of the animal, the other end of the leash/collar strap the leash/collar strap is passed through the same slotted opening 11 attached to the bitter end (animal end) and then through the second slotted opening 11. The leash/collar strap from the second opening 11 forms a leash with an extended tag loop (the leash and handle) from the remaining strap. To adjust or remove the collar from the animal, the user simply feeds the leash/collar strap slack through the openings 11 of the buckle slide 10 until the desired collar size is created. The buckle slide 10 also has an extended leg 13 with a hole 12 to receive a traditional dog tag.

Figure 3A:
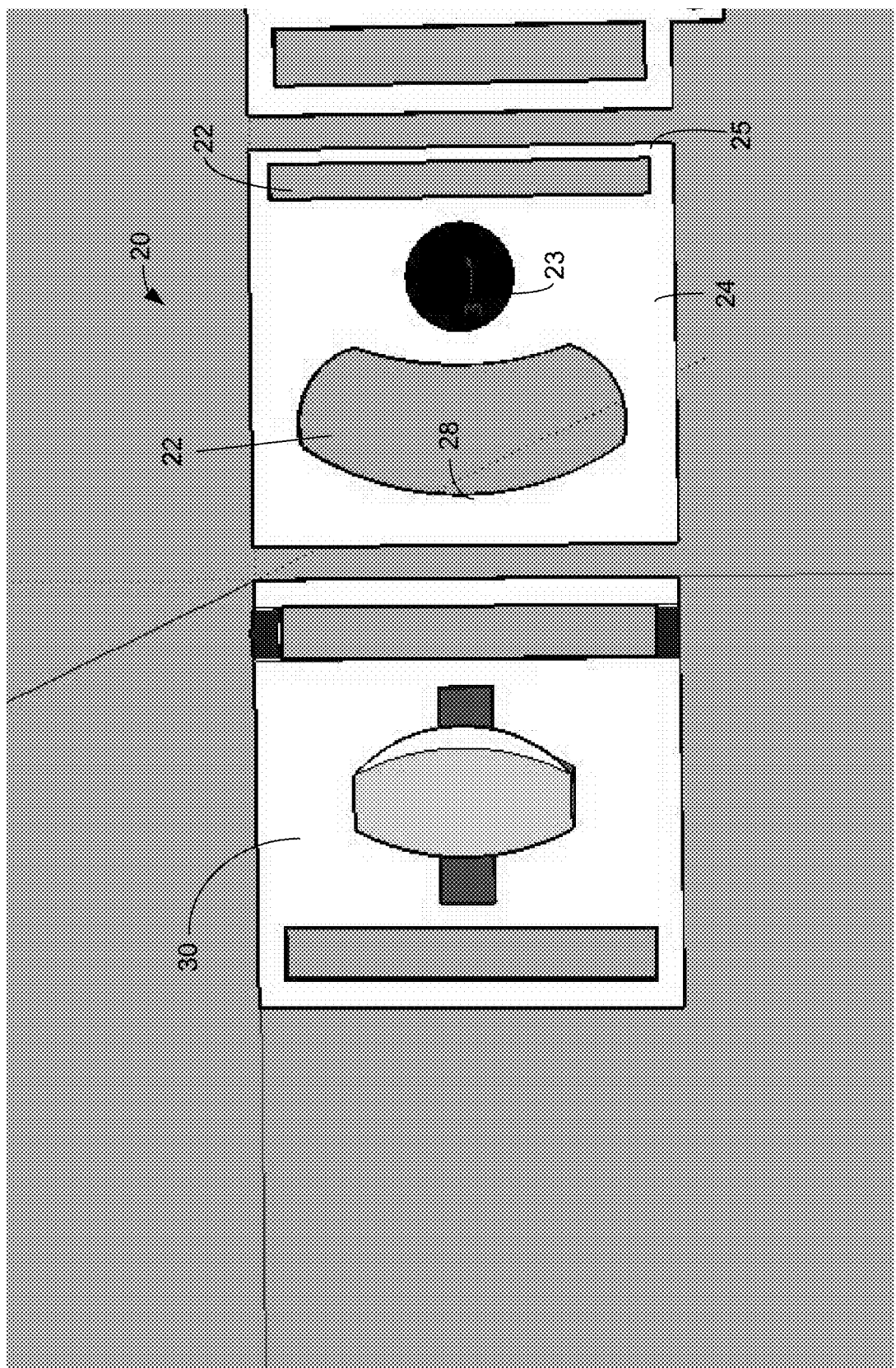
FIG. 3A shows a top view of an adjustable receiver and a flat end buckle which work with the FIG. 2 buckle slide in one embodiment of the present invention.
Figure 3B:
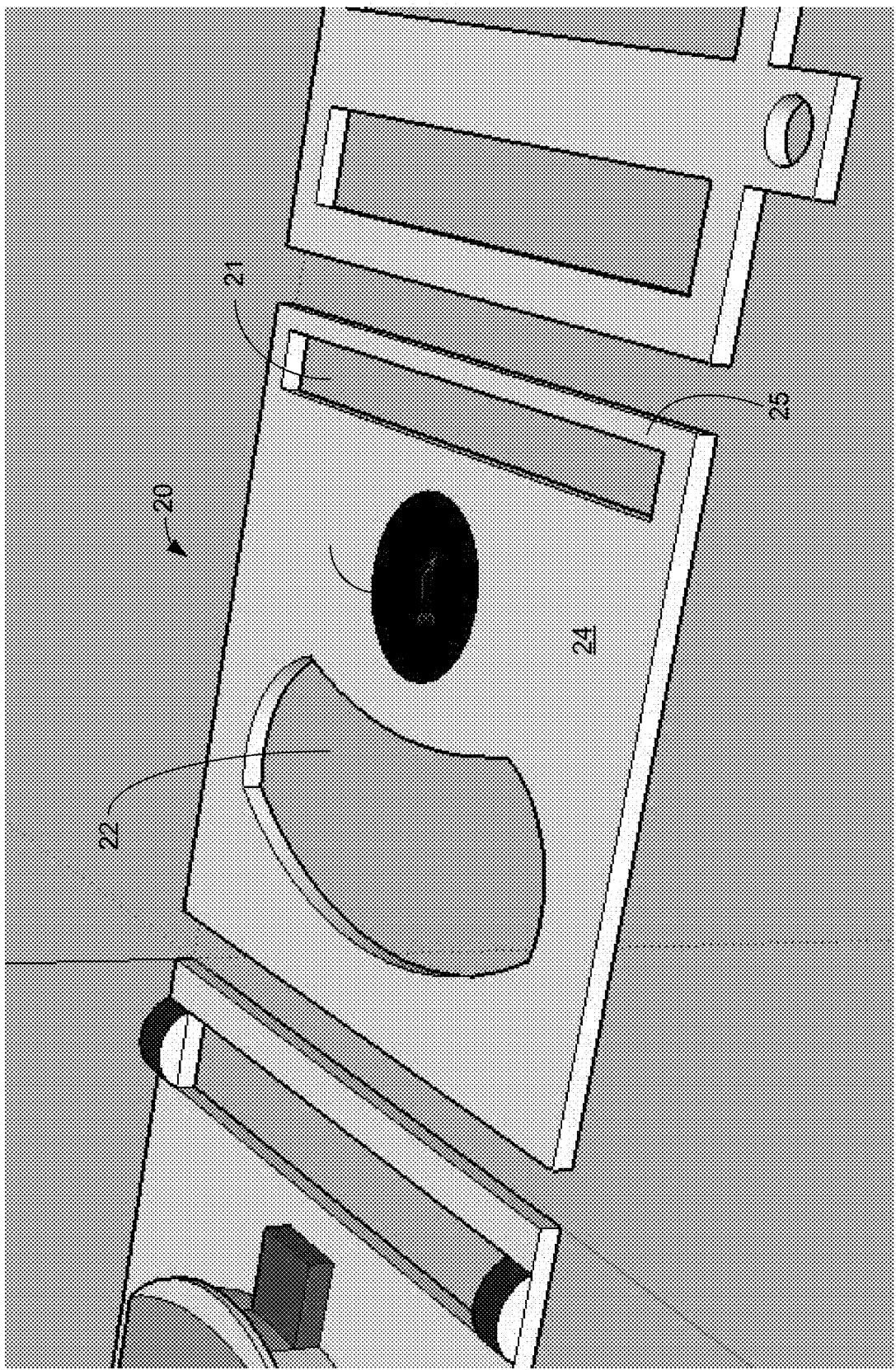
FIG. 3B shows a perspective and more detailed view of the flat end buckle.

A flat end buckle 20 at the other end of the leash/collar strap is shown on the right in a top view in FIG. 3A and in the middle in a perspective view in FIG. 3B. The flat end buckle 20 has a flat metal body 24 having a slotted opening 21 at an end 25 to provide an attachment location for the other end of the leash/collar strap opposite the collar end. The leash/collar strap can be attached to the opening 21 in the same manner as described with respect to the attachment of leash/collar strap to buckle slide 10. In the flat body 24 there is another opening 22 for receiving a post from the adjustable receiver 30 to form a leash loop or to store the incorporated leash/collar strap, as explained in greater detail below. The opening 22 is also shaped to operate as a bottle opener, such as a beverage bottles cap opener. A round laser cut bar code/logo hole 23 in the flat body 24 provides direction to a designated website for animal owner information and leash/collar brand identification. Not shown in FIGS. 3A-3C, the buckle 20 may also have an extension with a hole of varying shapes for different purposes. This feature appears in the flat end buckle of FIG. 4D.

Figure 3C:
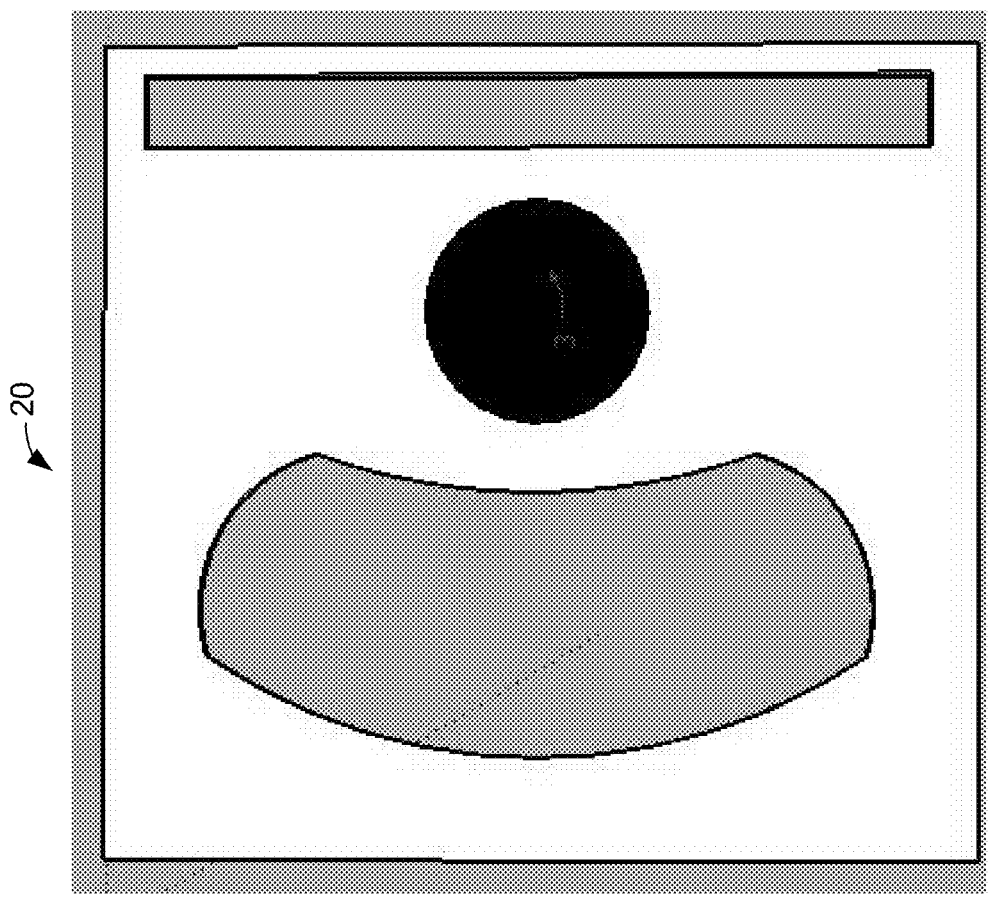
FIG. 3C shows a top view of a modified flat end buckle.

FIG. 3C shows a top view of the flat end buckle 20 which has a rectangular outline. In this embodiment the buckle 20 is of even thickness of slightly less than 0.09 inches, 1.79 inches long and 1.25 inches wide. The buckle 20 can also be in a range of thicknesses from 0.06 to 0.12 inches, a range of lengths from 0.5 inches to 3 inches and a range of widths from 0.5 to 3 inches.

Figure 4A:
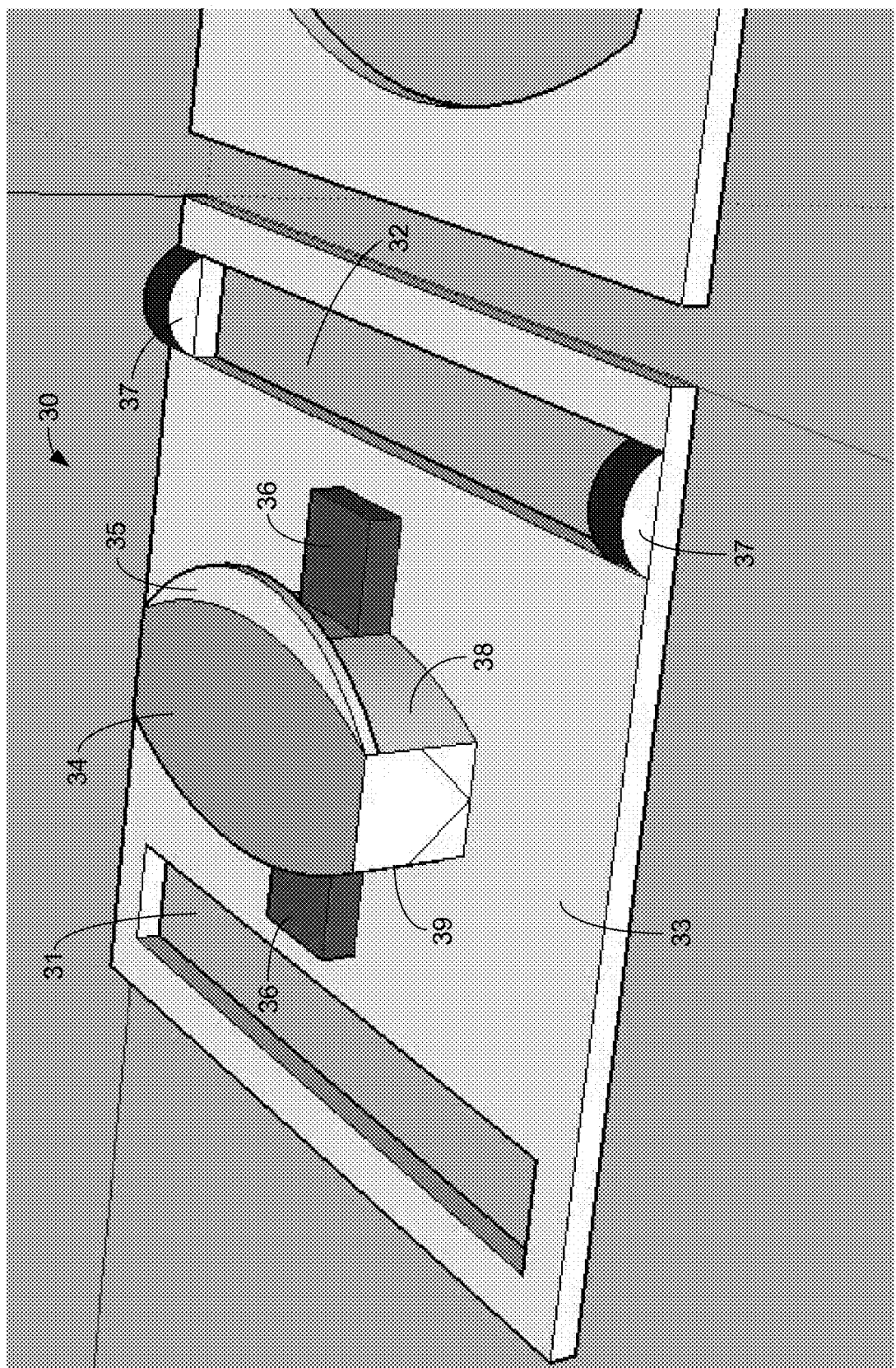
FIG. 4A shows a perspective view of the adjustable receiver of FIG. 3A.

The adjustable receiver is positioned on the leash/collar strap between the buckle slide and end buckle. Perspective views of an adjustable receiver 30 are shown in FIG. 4A. The adjustable receiver 30 has a flat body 33 with two slotted strap guide openings 31 and 32 at either end of the body 33 for the leash/collar strap; a shaped post 34 extending away from one side of the flat body 33, the other side of the body 33 (not shown in FIG. 3A) remaining flat; a rectangular magnet 36 running underneath the post 34 to receive and magnetically attach to the metallic flat end buckle 20; and rocker bump/ramps 37 at the ends of one of the strap guide openings 31 and 32. At the top of the post 34 is a cap lip 35 which faces toward the strap guide opening having the rocker bump/ramps 37. In this example the rocker bump/ramps 37 are located at the ends of the leash/collar strap guide opening 32.

The adjustable receiver 30 lies on the leash/collar strap between low profile buckle slide 10 and the flat end buckle 20. The leash/collar strap passes through the strap guide openings 31 and 32, and behind the flat body 33 on the side opposite the shaped post 34. The location of the adjustable receiver 30 on the leash/collar strap can be adjusted in the same manner as the buckle slide 10 for the full length of the leash/collar strap. This large adjustment range creates a leash/collar combination that will fit any dog, from small to large.

The adjustable receiver 30 also allows the user to create a secure leash handle with the leash length adjustment. The receiving post 34 of the adjustable receiver 30 is complementarily shaped to fully engage with the post opening 22 in the flat end buckle 20. Thus in a top view the side surface 38 (and the opposite side surface 39) of the post 34 is crescent-shaped and the complement of the side surface 28 of the post opening 22 of the flat end buckle 20. Furthermore, the height between the top of the magnet 36 and bottom of the lip 35 of the post 34 matches the thickness of the flat end buckle 20. When the post 34 is inserted into the post opening 22, the magnet 36 proving a flat surface for the adjustable receiver 30 attracts the metal of the buckle 20 so that the buckle 20 and receiver 30 securely fit and lock into each other. The buckle 20 and receiver 30 may have different shapes including, but not limited to: circular, triangular, square, trapezoidal, 'T' or any other interlocking shapes.

The flat end buckle 20 and the adjustable receiver 30 can fit and lock together in two opposing directions to place the incorporated leash/collar in operative and storage configurations. For the operative configuration the leash/collar strap between the buckle 20 and receiver 30 form a loop for a leash handle to the collar. The flat end buckle 20 and receiver 30 are joined so that the side surface 38 of the receiver post 34 engages the side surface 28 of the post opening 22 of the flat end buckle 20. The flat body 24 of the buckle 20 rests on the bumps 37 of the adjustable receiver 30 with top of the buckle body 24 near the side surface 28 of the post opening 22 fitting under the receiver lip 35. The action of the magnet 36 maintains the adjustable receiver 30 against the metal buckle 20. This arrangement provides a strong leash loop which is resistant to variable forces along the leash, such as caused by a lunging dog on the collar. The rocker bump/ramps 37 on the side of the lip 35 help release the formed leash loop. The rocker bump/ramps 37 provide a lever to remove the flat end buckle 20 from under the lip 35.

For a storage configuration the leash/collar strap is wound around the collar (and flat buckle slide 10) and held in place for storage by the engagement of the buckle 20 at the end of the leash/collar strap to the adjustable receiver 30. The location of the adjustable receiver 30 is set so that flat end buckle 20 which is looped around the collar is able to engage the adjustable receiver 30. In this case the side surface 39 of the receiver post 34 engages the side surface 28 of the post opening 22 of the flat end buckle 20 and the magnet 36 engages the flat end buckle 20. for a secure, yet releasable storage configuration.

Hence among the parameters to be considered for the magnet 36 and the metal of the flat buckle 20 are attractive force, size, cost and weight of these components. The adjustable receiver 30 is sized to fit the flat end buckle 20 and both elements can have a wide range of sizes and dimensions.

As shown above both post sidewalls 38 and 39 of the adjustable receiver 30 are shaped complementarily with respect to the sidewall 28 of the flat buckle 20. As a result, in a top view the post 34 is shaped symmetrically about an axis perpendicular to the longitudinal direction of the leash/collar strap, i.e., the sidewalls mirror each other across the axis. But the post of, and the adjustable receiver 30 itself, may be shaped and arranged differently as long as this symmetry is retained.

Figures 4B, 4C:
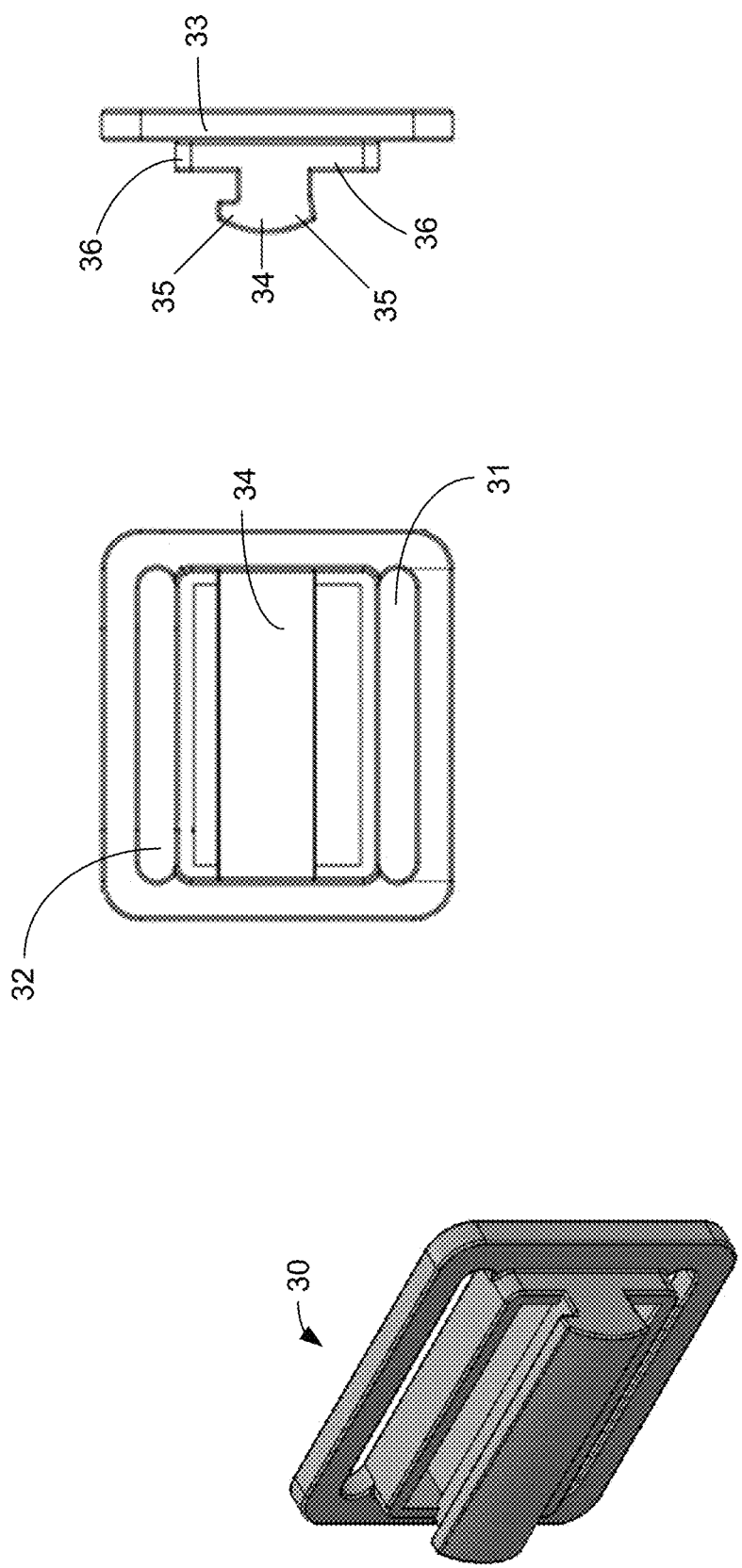
FIG. 4B shows a perspective view of another adjustable receiver in accordance with the present invention.
FIG. 4C shows different side views of the FIG. 4B adjustable receiver.
Figure 4D:
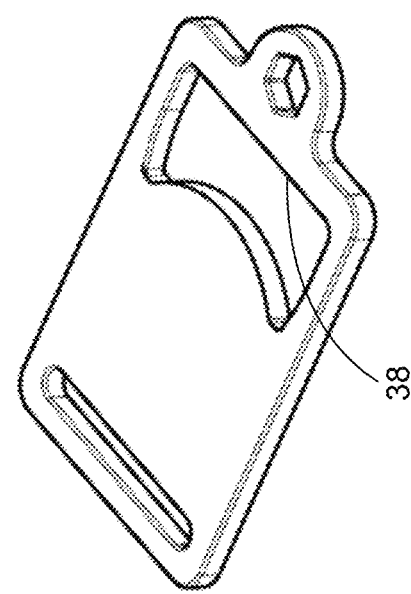
FIG. 4D shows different views of a flat end buckle which corresponds to the adjustable receiver of FIGS. 4B and 4C.
Figure 4D:
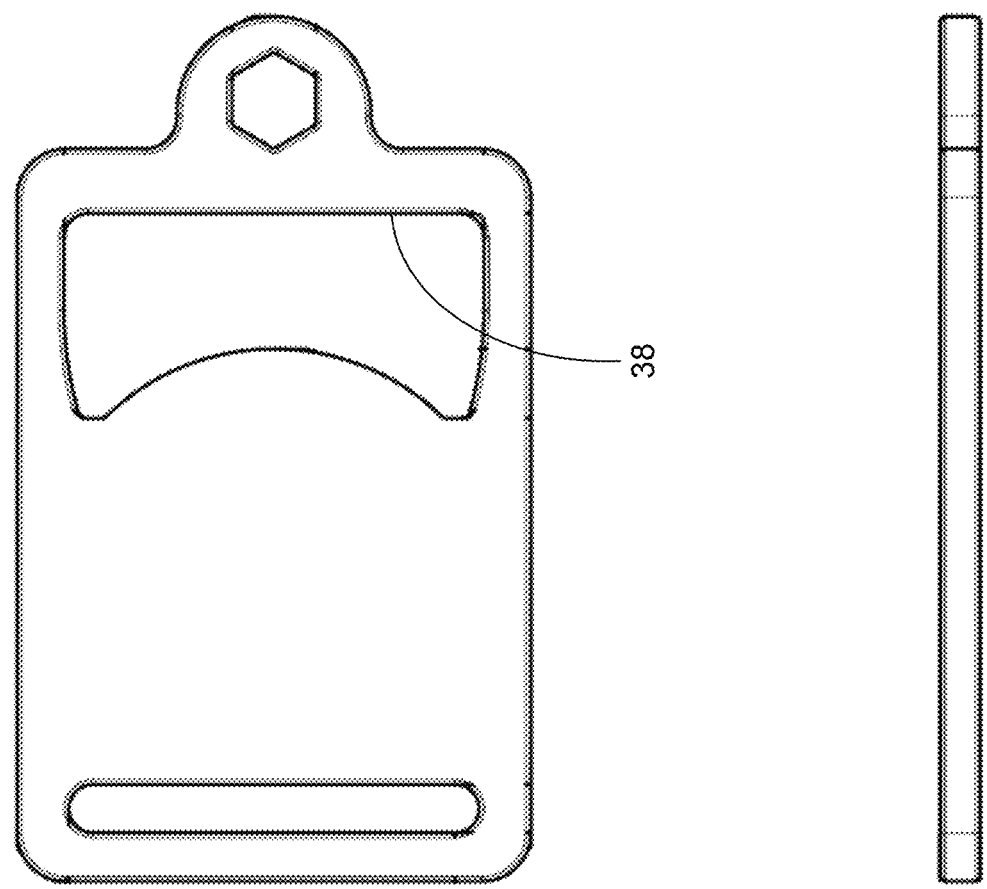

For example, FIGS. 4B and 4C illustrate an adjustable receiver with a post 34 which is rectangular in shape in a top view. The magnet 36 runs under, and forms the base of, the post 34 and no bump/ramps 37 are used in adjustable receiver 30. Flange lips 35 appear above both sidewalls of the post 34 but the lip above the sidewall used in the operative configuration is larger for more substantial engagement of the receiver 30 and buckle 20. FIG. 4D illustrates a flat end buckle which corresponds to the adjustable receiver of FIGS. 4B and 4C. The sidewall 38 of the opening in the FIG. 4D flat end buckle is straight to match the straight sidewalls of the post 34 of the FIGS. 4B and 4C adjustable receiver. The flat end buckle further has an extension with a hole which in this example is hexagonally shaped to receive a tool, such as a socket, wrench screwdriver, and other similar items.

Figure 11A:
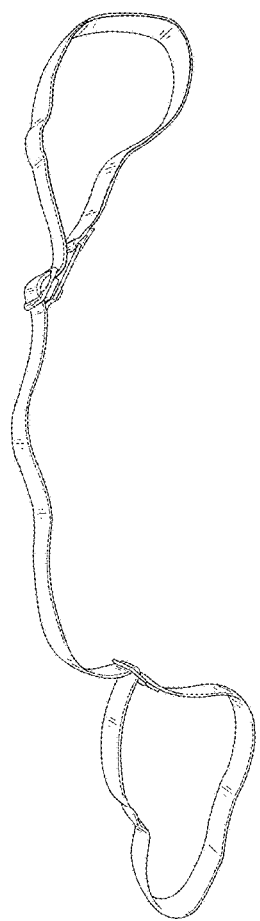
FIG. 11A shows a perspective view of an incorporated leash/collar in an operative configuration in accordance with one embodiment of present invention.
Figure 11B:
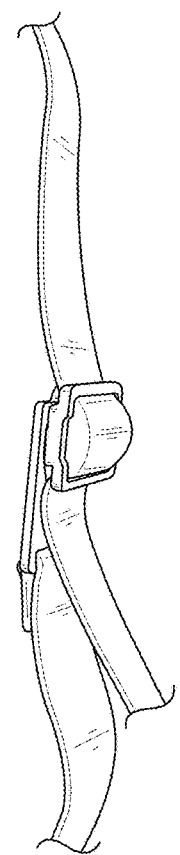
FIG. 11B shows the adjustable receiver and flat end buckle in FIG. 11A in detail.
Figure 11C:
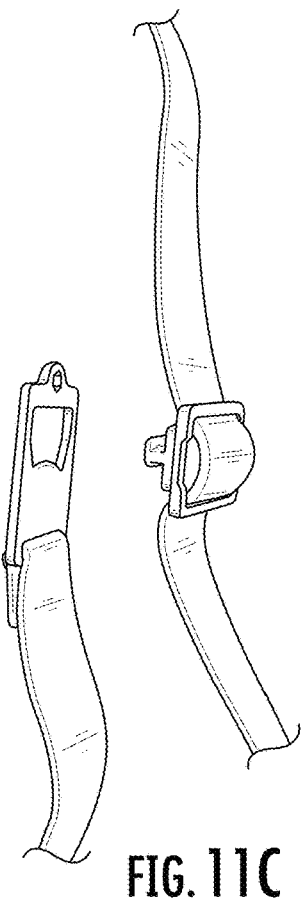
FIG. 11C shows the adjustable receiver and flat end buckle in FIG. 11B as separated.

FIG. 11A shows an incorporated collar/leash in a operative configuration with the adjustable receiver in FIGS. 4B and 4C and the flat end buckle in FIG. 4D. As described earlier with respect to a previously described adjustable receiver and flat end buckle, the leash/collar strap between the buckle 20 and receiver 30 forms a loop (shown on the left of FIG. 11A) for a leash handle to the collar (shown on the right of the FIG. 11A). FIGS. 11B and 11C show the flat end buckle and adjustable receiver in more detail. FIG. 11B shows the flat end buckle and adjustable receiver engaged and joined to form the loop and FIG. 11C shows the buckle and receiver disengaged and separated.

Figure 12A:
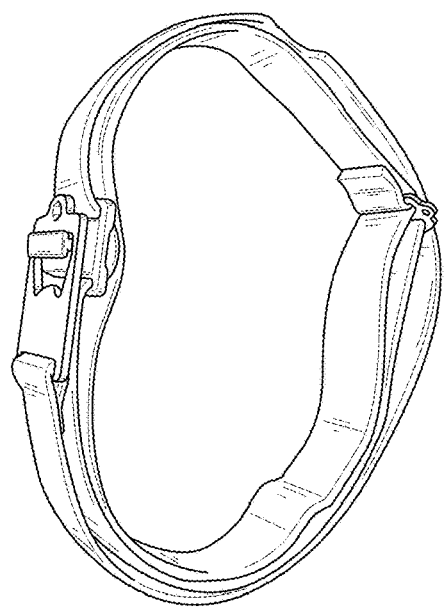
FIG. 12A shows a perspective view of the FIG. 11A incorporated leash/collar in a stored configuration.
Figure 12B:
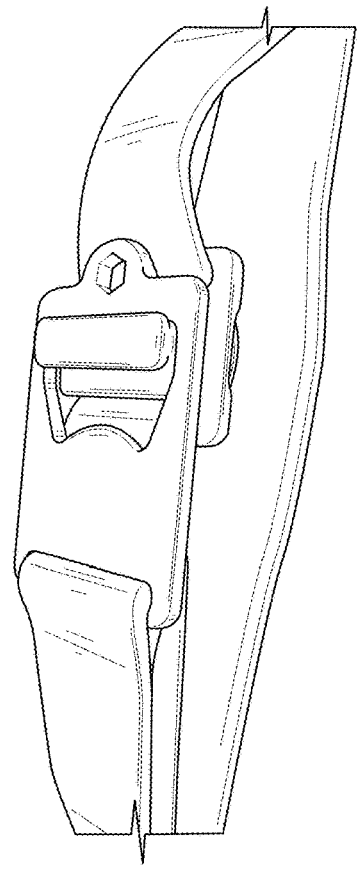
FIG. 12B shows the adjustable receiver and flat end buckle in FIG. 12A in detail.
Figure 12C:
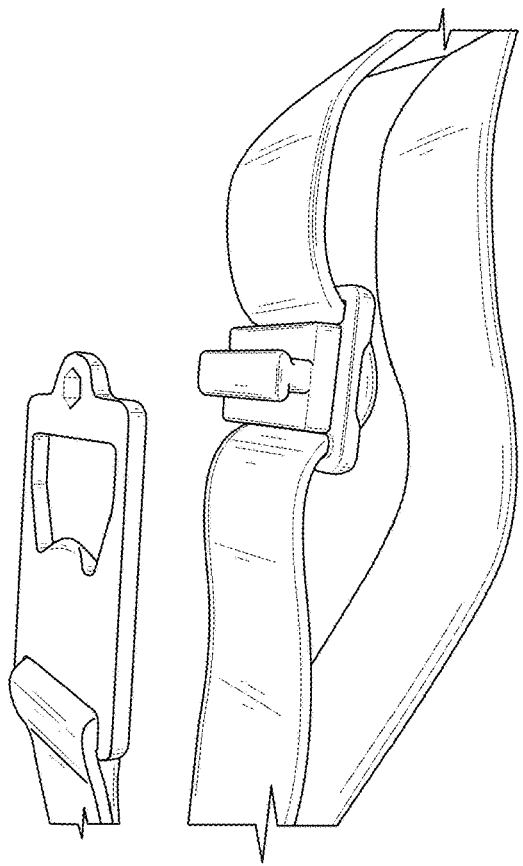
FIG. 12C shows the adjustable receiver and flat end buckle in FIG. 12B as separated.

FIG. 12A shows an incorporated collar/leash in a storage configuration with the adjustable receiver in FIGS. 4B and 4C and the flat end buckle in FIG. 4D. As described earlier with respect to the previously described adjustable receiver and flat end buckle, the leash/collar strap is wound around the collar and held in place by the engagement and joining of the flat end buckle and adjustable receiver. FIGS. 12B and 12C show the buckle and receiver in more detail with the flat end buckle and adjustable receiver engaged and joined around the collar in FIG. 12B and the buckle and receiver disengaged and separated in FIG. 12C.

In one example, the adjustable receiver of FIGS. 4B and 4C is 1.125 inches long (along the strap extension), 1.25 inch wide (strap width) and 0.39 inches high (from bottom of adjustable receiver to top of post), and the distance between magnet base and flange lips is slightly more than 0.09 inches. The corresponding flat end buckle is 2.11 inches long, 1.25 inches wide and 0.09 inches thick. These dimensions are merely illustrative and not limiting so that a range of sizes and dimensions can be used for these elements to suit particular applications and circumstances.

Figure 5A:
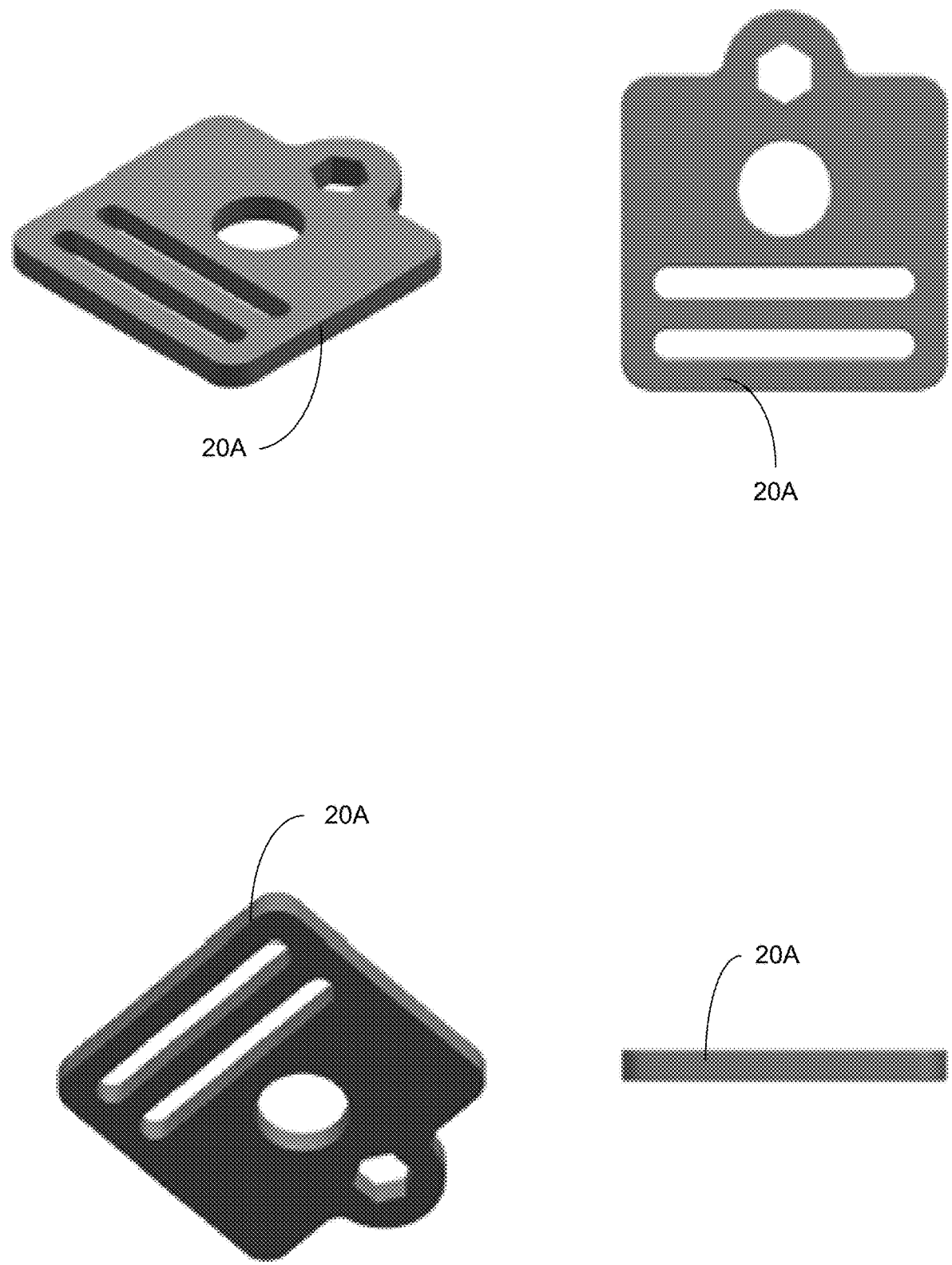
FIG. 5A shows different perspectives view of another flat end buckle in accordance with the present invention.
Figure 5B:
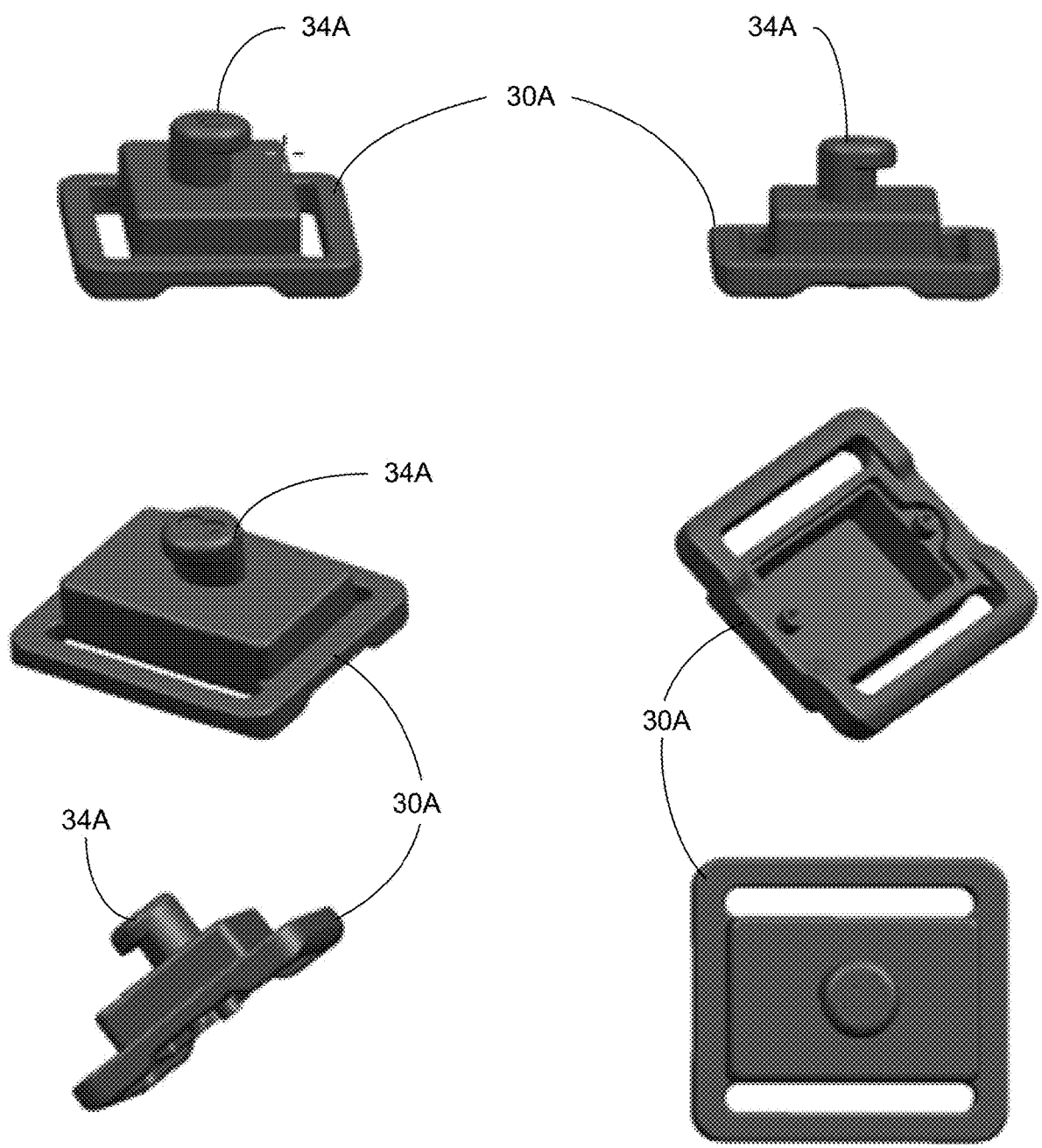
FIG. 5B shows different perspective views of another adjustable receiver 30 corresponding to the FIG. 5A flat end buckle.

FIG. 5A illustrates another flat end buckle 20A and FIG. 5B illustrates a corresponding adjustable receiver 30A. The buckle 20A has two slotted openings to receive the leash/collar strap such that the buckle 20A while attached to an end of the leash/collar strap can also be moved along the strap. For example, the strap end can be fixed to or around the straight end of the buckle 20A. The rest of the strap can then be passed through one of the slotted openings around the metal shaft separating and defining the two slotted openings and passed through the second in the same manner as previously described for the buckle slide 10. This arrangement allows some play in the position of the buckle 20A with respect to the adjustable receiver around the collar in a storage configuration.

The flat body of the buckle 20A has a central circular opening 22A and a smaller hexagonal opening around which an accessory might be hung. The adjustable receiver 30A of FIG. 5B is similar to the adjustable receiver shown and described with respect to FIGS. 4B and 4C. But the post is circular (in a top view) and dimensioned to match the dimensions of the opening 22A of the buckle 20A. A flanged lip also appears above one side of the post 34A for a more secure engagement and lock between the receiver 30A and the end buckle 20A.

A short section of stretchable material, such as bungee webbing, may also be used to connect the non-stretchable webbing material of the leash/collar strap and the flat end buckle 20. The bungee material stretches to hold the flat end buckle 20 to the adjustable receiver 30 in storage configuration and keeps the wraps of the leash stored neatly around the collar and allows for adjustment play.

Figure 6:
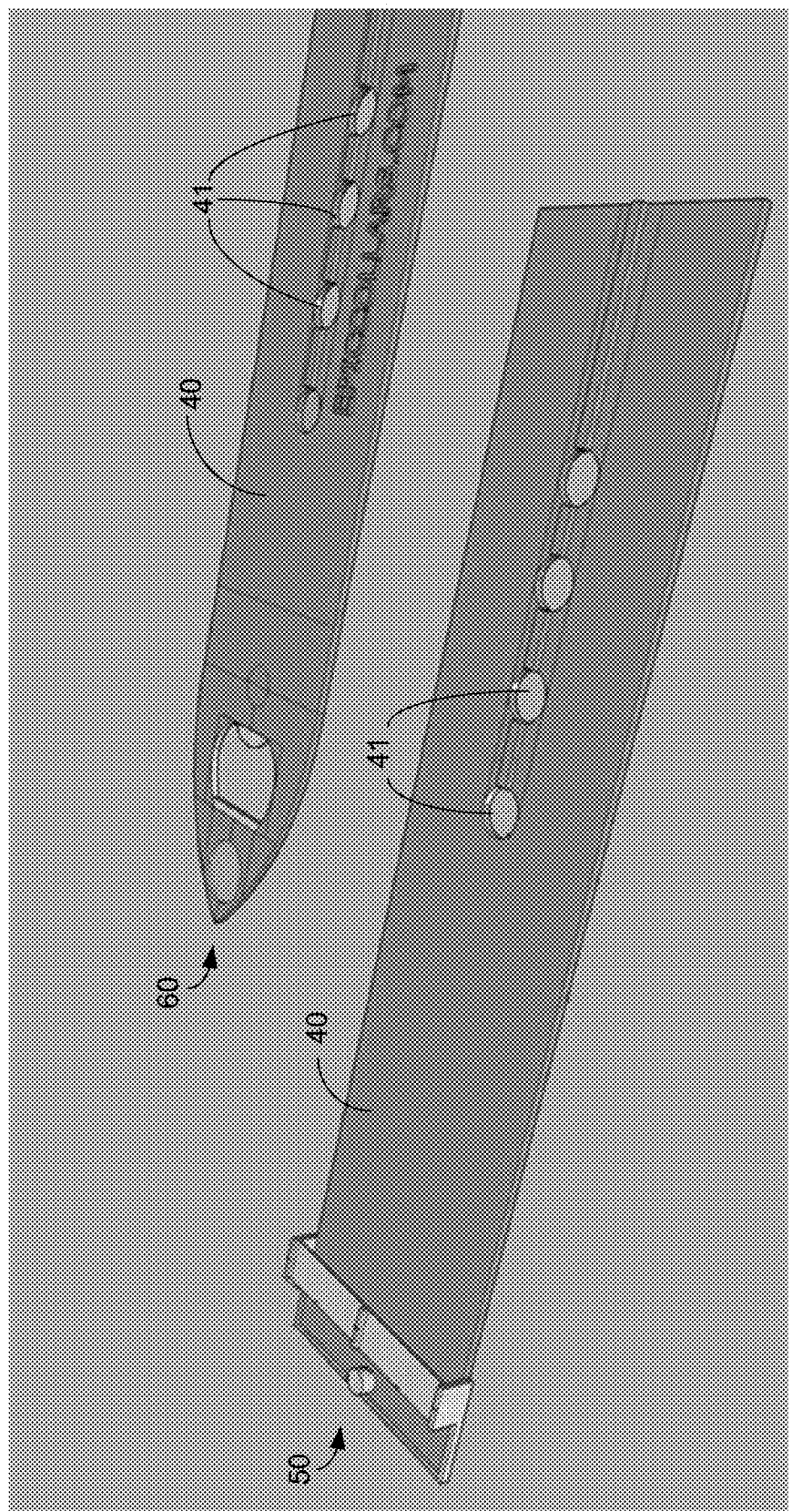
FIG. 6 shows in a perspective view the opposite ends of an improved incorporated leash/collar according to another embodiment of the present invention.

In another embodiment of the incorporated collar/leash, the leash/collar strap is constructed from a stretchable webbing material, such as an elastic polymer. The incorporated leash/collar strap 40 in FIG. 6 shows the two ends of the incorporated collar/leash. A collar receiver guide and barb assembly 50 at the bitter end (the dog end of the leash) is shown at the bottom left of the drawing and the handle/leash re-attach assembly 60 shown at top right of the drawing and located at the other end (the handler end) of the leash/collar strap 40.

Figure 7A:
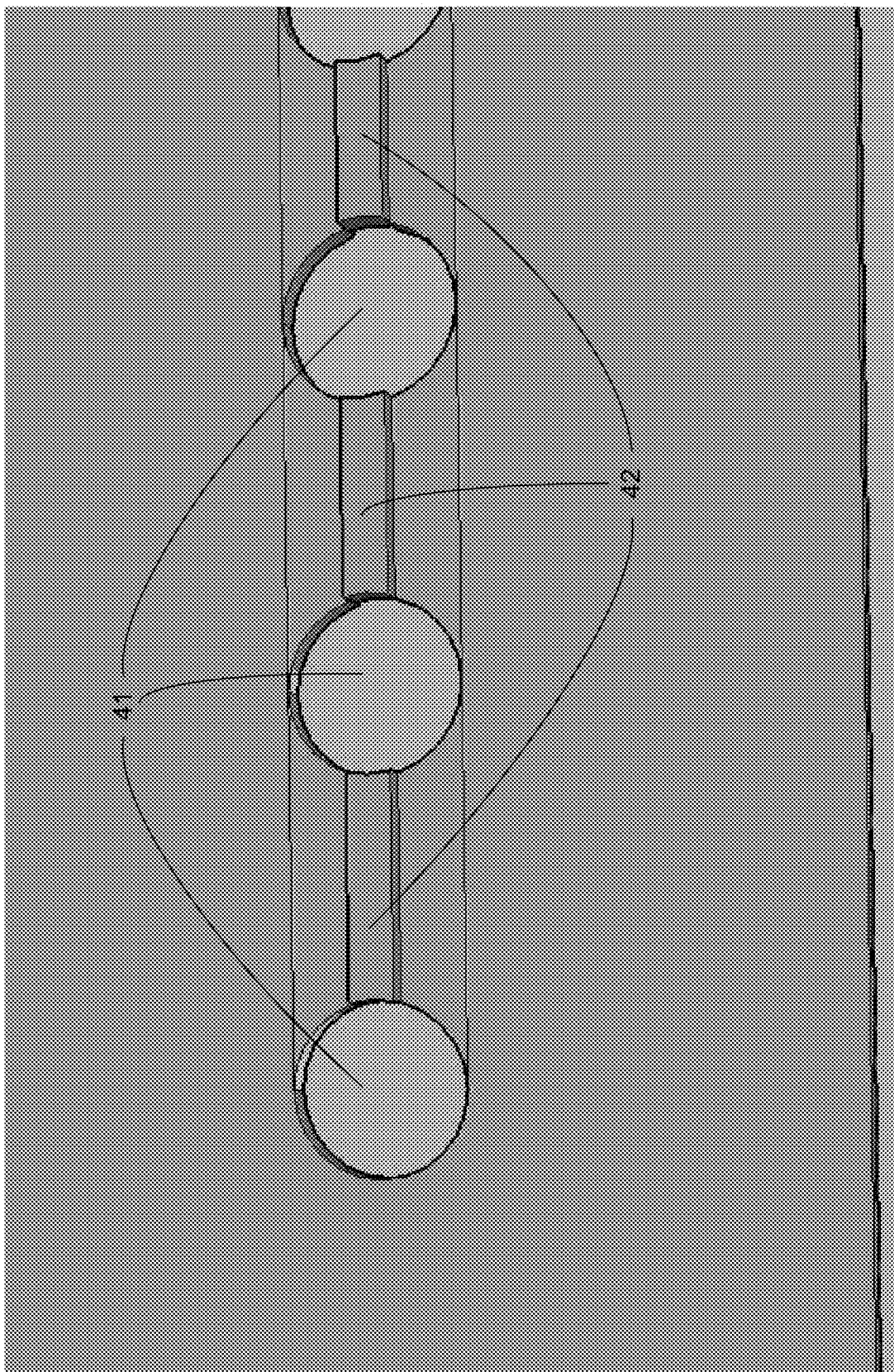
FIG. 7A shows details of a hole and rail/channel system of the improved incorporated leash/collar of FIG. 6.
Figure 7B:
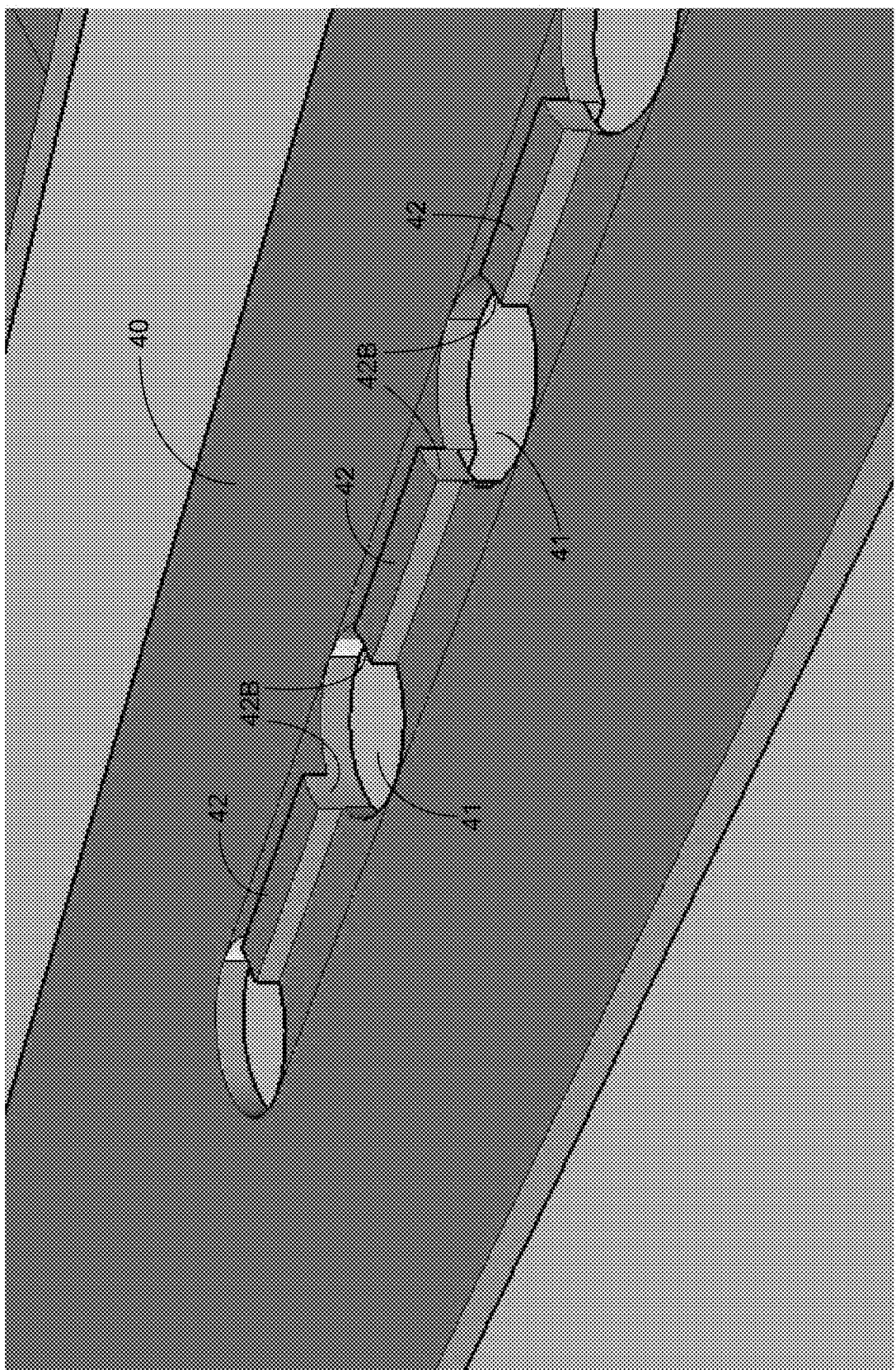
FIG. 7B shows a perspective top view of the hole and rail/channel system of FIG. 7A.
Figure 7C:
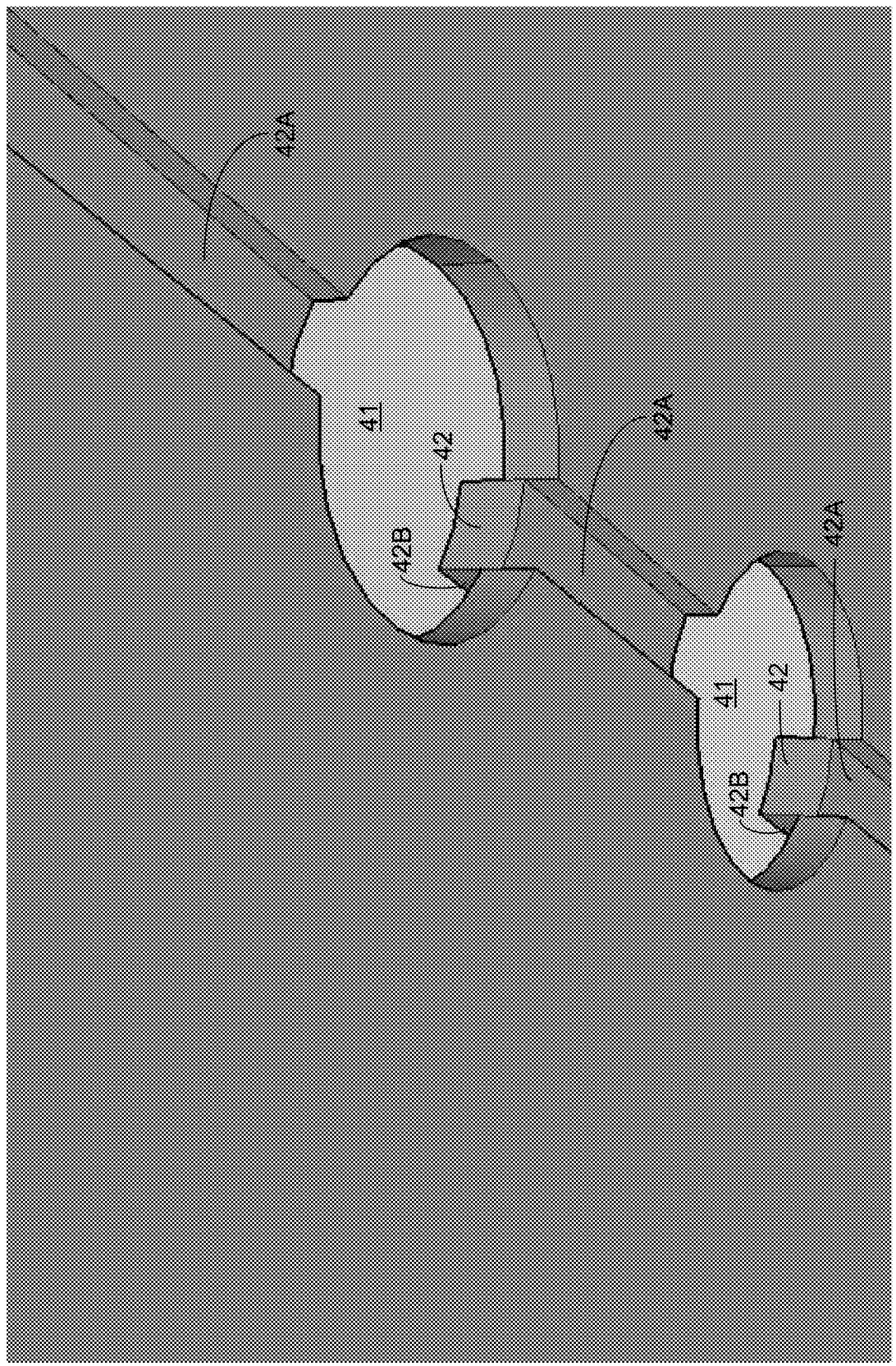
FIG. 7C shows a perspective bottom view detail of the hole and rail/channel system of FIG. 7A.

A series of holes 41 run along the center of the leash/collar strap 40 from approximately 10 inches from the bitter end on the collar side (at the dog) to within 6 inches of the other end (handler end) 60. FIGS. 7A-7C shows the holes 41 in the leash/collar strap 40 in more detail. The distributed holes 41 capture studs or hooks to form the base collar through a base collar guide, to attach the leash/collar strap 40 to itself so that the leash stays in place in this storage configuration, or to form the loop handle for the leash in an operative configuration. Accessories, such as a dog tag, capture magnet, flashlight, GPS tracking module, multi-tool and other items, can be attached to the collar/leash 40 by accessory studs or hooks for the holes 41. The holes 41 can be any geometric shape including, but not limited to, round, oval, square, a T or a cross pattern. Further explanations of the leash/collar strap 40 are detailed below.

A rail/channel structure 42 in the stretchable webbing material runs between the holes 41 for the length of the distributed holes. FIGS. 7A and 7A shows the rail portion 42B of the rail/channel 42 on one side of the leash/collar strap 40. The rail portion 42B is formed by vertically raising the elastic polymer material of the leash/collar strap 40. On the other side of the leash/collar strap 40, the underside of the rail/channel 42, shown in FIG. 7C, a channel portion 42A, the reciprocal of the rail portion 42B, runs between the holes 41.

The rail portion 42B and channel portion 42A are sized and shaped so that the channel portion 42A on one side of the leash/collar strap 40 can capture the rail portion 42A on the opposite side of the leash/collar strap. The rail portion 42B nests into an embedded, concave track of the channel portion 42A in an elastic tongue-and-groove arrangement similar to a Ziplock® (a registered trademark of the S.C. Johnson & Son, Inc. of Rachine, Wisconsin) enclosure. The raised rail/channel structure 42 aids in the neat stacking of the leash/collar 40 about itself in a storage configuration with the raised metal guide on the collar receiver guide and barb assembly 60.

Figure 8:
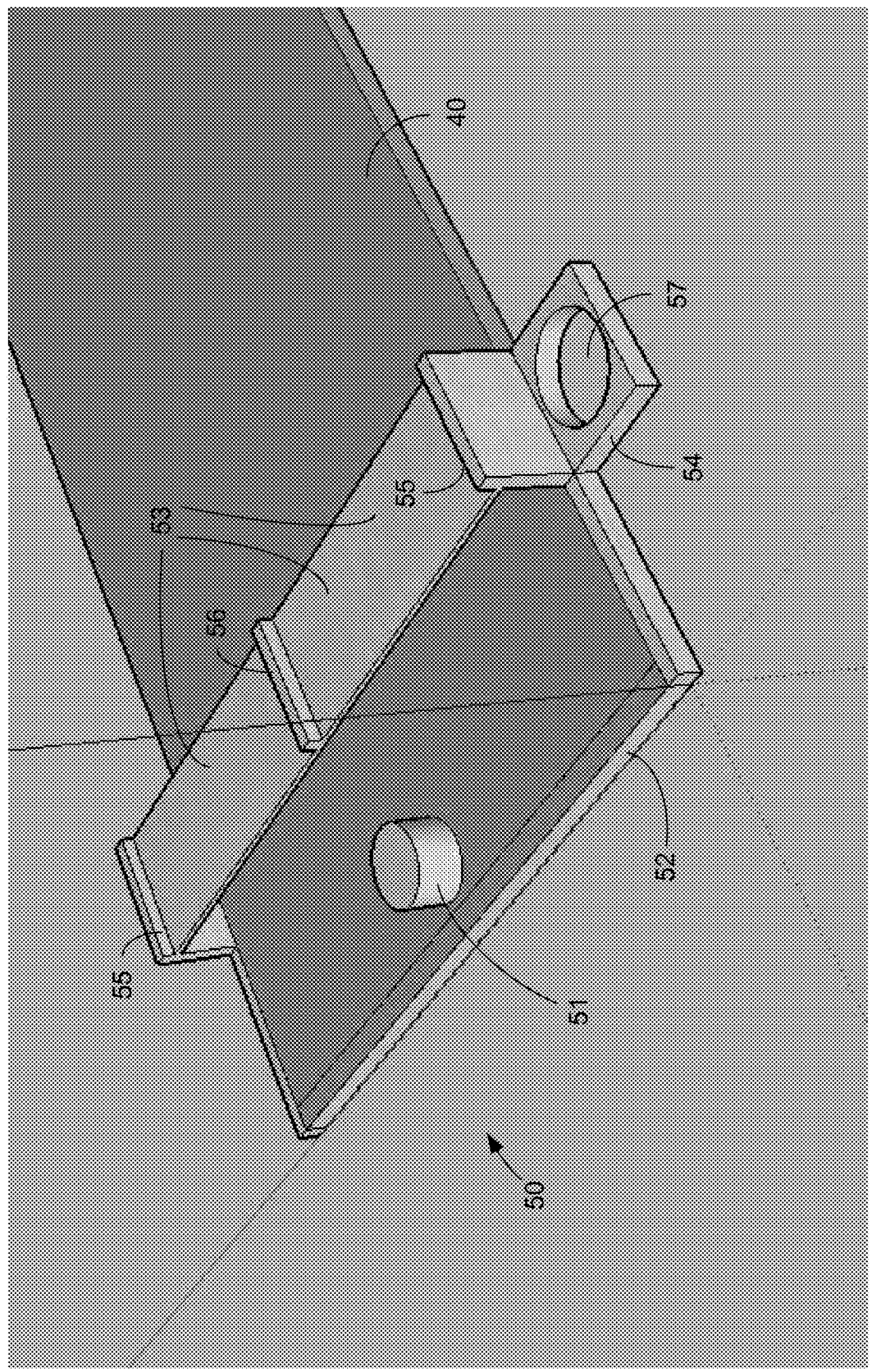
FIG. 8 shows details of the collar receiver guide and barb attachment assembly of the improved incorporated leash/collar of FIG. 6.

The collar receiver guide and stud assembly 50 of the leash/collar strap 40 is shown in FIG. 8. The collar receiver guide and the stud assembly 50 has a rectangular flat body 52 to which the webbing material of the leash/collar strap 40 is attached. A post or stud 51 extends perpendicularly from the flat body 52 at an end of the leash/collar strap 40 through the webbing material. The diameter of post or stud matches that of the holes 41 and the length of the post or stud is preferably at least the thickness of the leash/collar strap to prevent disengagement when the post or stud 51 is set into one of the holes 41.

A collar guide hoop 53 extends from the sides of the flat body 52 displaced away from the stud 51 over the strap 40. The collar guide hoop 53 is aligned perpendicularly to the length of leash/collar 40, and is rectangular in a view along the leash/collar 40. The top of the guide hoop 53 has a center guide rail 56 and two side rails 55, all of which are parallel to the length of the leash/collar strap 40 in the body 52. The center guide rail 56 is sized like the rail portion 42B to fit into and engage the channel portion 42A of the leash/collar strap 40, and the side rails 55 are spaced apart to receive the leash/collar strap 40 between them. The flat body 52 has an extended tag 54 having a hole 57 for the attachment of a traditional dog tag.

The flat body 52 of the collar receiver guide and the stud assembly 50 may embedded into the polymer material of the leash/collar 40 or attached to the material by stitching, rivets, glue or a slotted metal channel to a corresponding rail in the webbing material. The collar receiver guide and stud assembly 50 may be constructed from metal, plastic, reinforced graphite, or other materials having the desirable characteristics of rigidity, strength and durability.

The collar receiver guide and stud assembly 50 forms a collar by looping the end of the leash/collar strap 40 and inserting the stud 51 into a hole 41 and passing the rest of the strap 40 through the collar guide 53. If the size of the collar needs to be adjusted, the stud 51 is detached from the original hole 41 and the leash/collar strap 40 slid through the collar guide 53 to the desired collar size. The stud 51 is then re-inserted into the corresponding hole 41. The collar guide 53 and the stud 51 provide a lock for the leash/collar strap 40 so that it neither loosens nor tightens on the animal. When the leash/collar strap 40 is wrapped around the collar, the center guide 56 fits into the channel portion 42A to hold the first wrap of the leash/collar strap 40 around the collar and the side rails 55 align the leash/collar strap 40 around the collar. This arrangement aids in the tidy stacking of the leash/collar strap 40 around the base collar in a storage configuration.

Figure 9A:
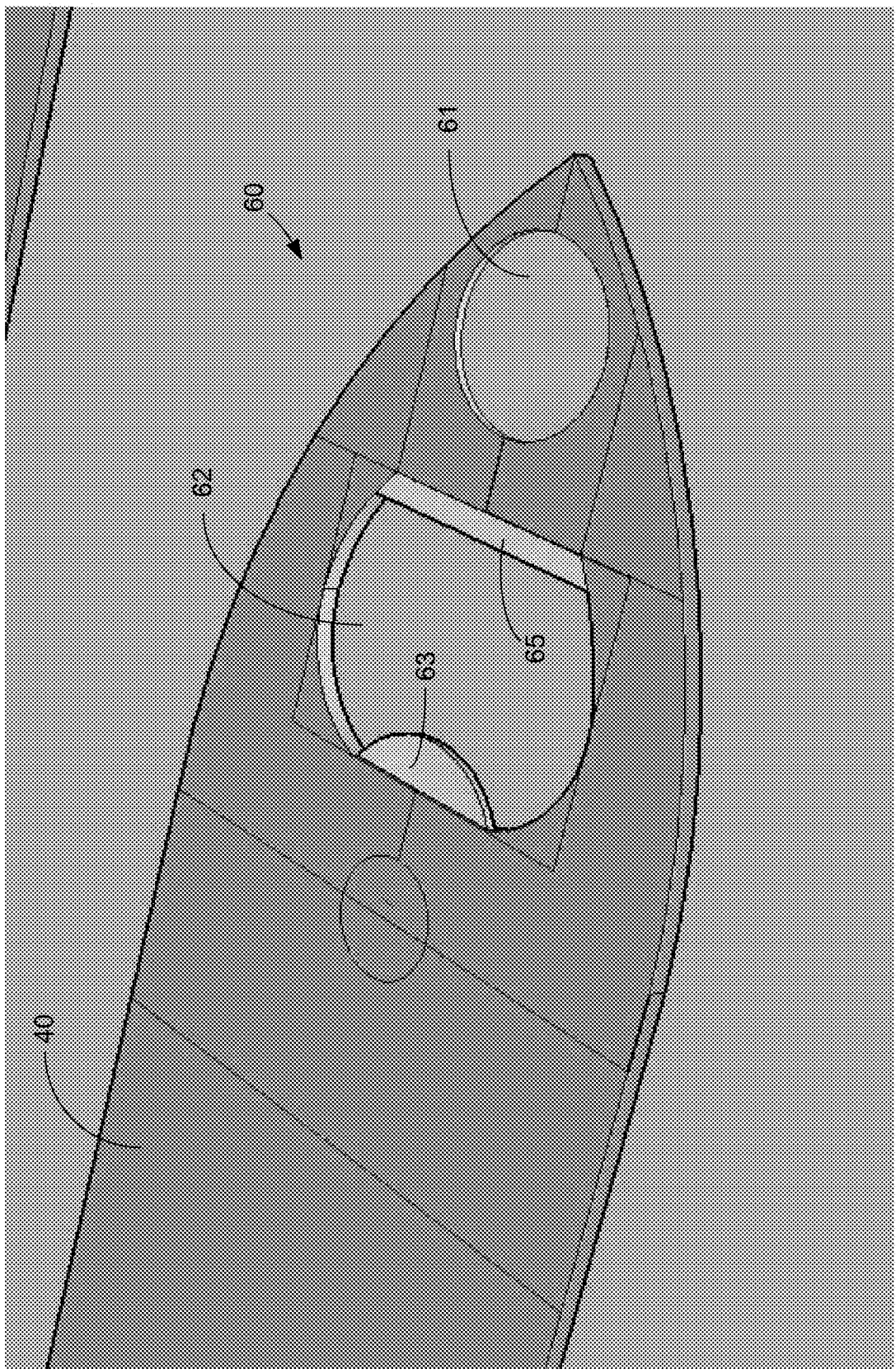
FIG. 9A shows in a perspective top view of the leash handle/leash re-attach assembly in FIG. 6.
Figure 9B:
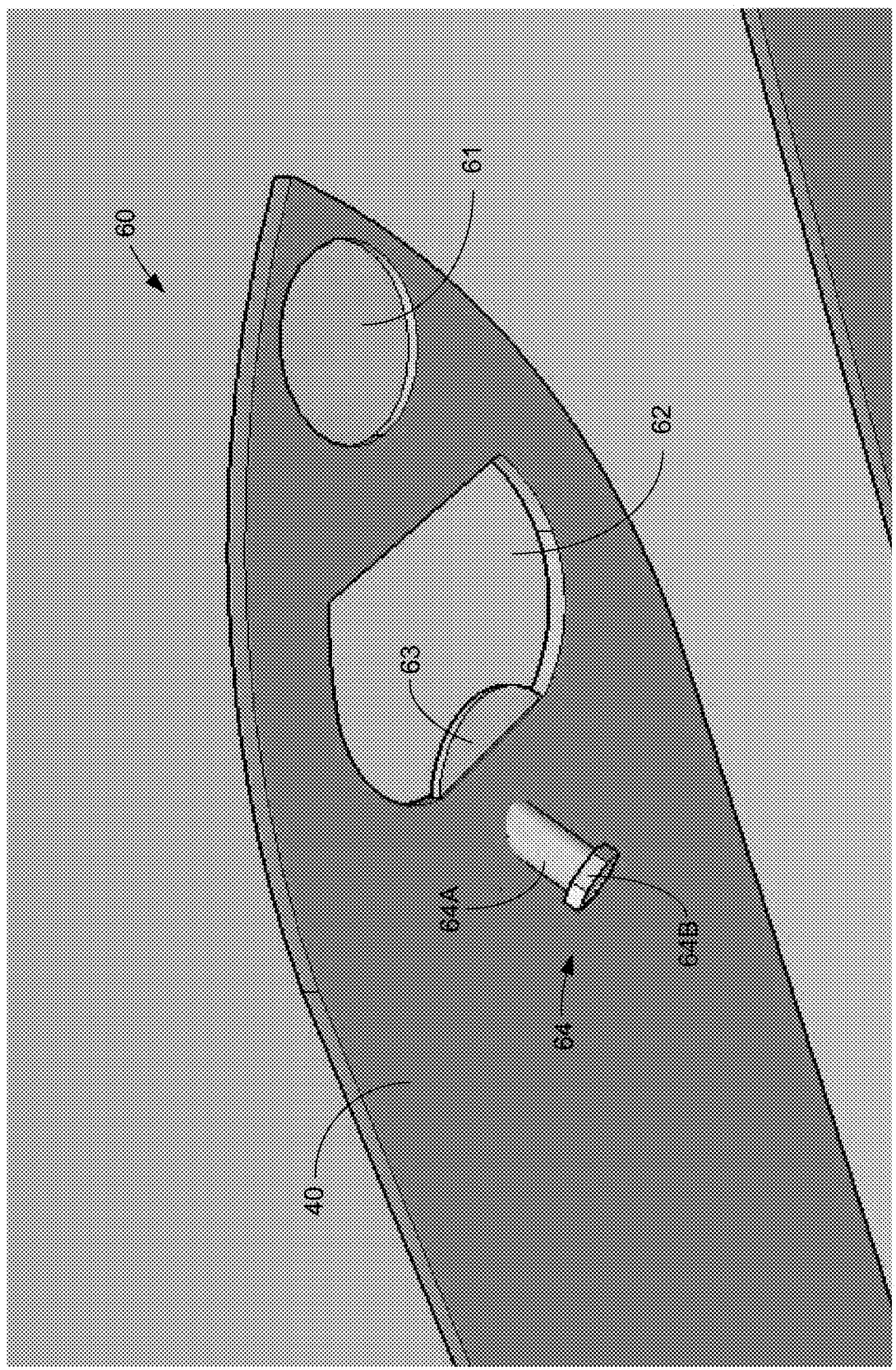
FIG. 9B shows in a perspective bottom view of the leash handle/leash re-attach assembly in FIG. 6.

The leash handle/leash re-attach assembly 60 shown in a top perspective view in FIG. 9A and in a bottom perspective view in FIG. 9B, is located at the user end of the leash/collar strap 40. The assembly 60 has a flat body with a narrowing tip. A first aperture 61 is located near the tip and a second aperture 62 in the flat body removed from the tip. Both apertures 61 and 62 are centered along the center axis of the leash/collar strap 40. The second aperture 62 is shaped with a straight metal edge 65 near the aperture 61 and a convex metal edge 63 opposing the straight edge 63, as seen in FIG. 9A. A bottom view of the assembly 60 (FIG. 9B) shows a hook 64 in the form of a short straight stud angled away from the tip. The hook 64 also has a cap at its end with flanges 64B. Alternatively the hook 64 may also be curved.

For the operative configuration of the incorporated leash/collar, the leash/collar strap 40 is looped back on itself. The hook 64 engages one of the holes 41 to form a sturdy and looked handle loop with the angle and capped flanges of the hook stud preventing disengagement of the hook 64 from the hole 41. The loop handle can be sized by selecting the appropriate hole 41. The first opening 61 is sized to accept a finger grip to disengage the hook 64 and pull the loop handle apart.

In the storage configuration the engagement of the hook 64 with one of the holes 41 provides a secure lock for the incorporated leash/collar. The straight edge 65, convex edge 64 and hook 64 of the leash handle/leash re-attach assembly 60 are preferably formed from a single metal piece which is embedded into the elastic polymer of the leash/collar strap 40. The single metal unit can be designed for additional integrity. The unit can be extended to cover the opening 61 with the underside exposed. In storage configuration a magnetized stud is inserted through a hole 41 in a location corresponding to that of the opening 61. The exposed metal in the opening 61 attaches to the magnetized stud so that the tip of leash handle/leash re-attach assembly 60 is also secured.

The two metal edges 63 and 65 in the second aperture 62 may be shaped to provide a handy bottle opener.

Figure 10A:
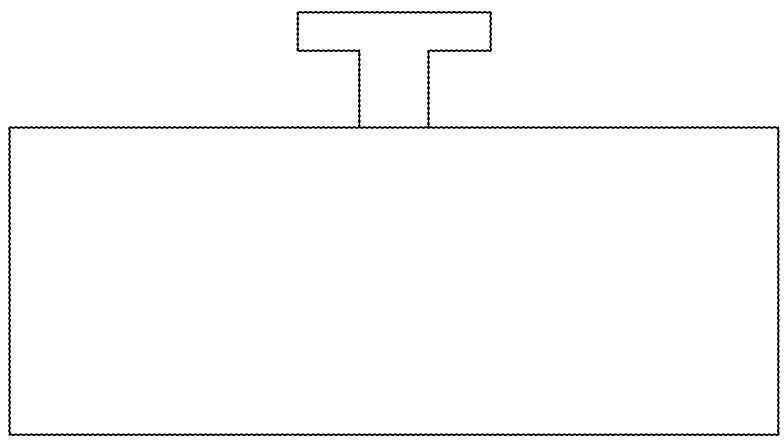
FIGS. 10A and 10B shows accessories which might be attached to the improved incorporated leash/collar of FIG. 6.
Figure 10B:
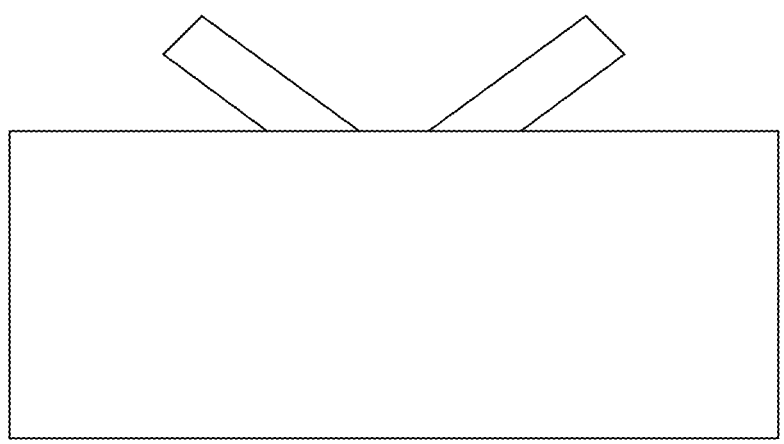

In addition, the rail/channel structure 42 with the holes 41 allow accessories to be attached to the leash/collar strap 40. Accessories with modified studs or hooks with the strap holes 40 provide secure attachment for the accessory. With a T-lock system, for example, studs may be inserted into the holes 41 and then twisted to fall into and engage the channel portion 42A, providing additional security for accessories attached to the modified studs. FIG. 10A shows an accessory in the form of a case bearing a T-lock stud. The case can carrying accessory items, such as a GPS tracking module unit, flash light, hand multi-tool and other useful objects. FIG. 10B shows an accessory case with two slanted studs to securely engage neighboring holes 41. Alternatively the accessory case might be eliminated and the modified studs or hooks attached directly to the accessory item itself.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. An improved incorporated leash/collar comprising:
   a strap;
   a buckle slide attached to a first end of the strap, the buckle slide engaging the strap to form a collar with the strap;
   a metal buckle attached to a second end of the strap, the buckle having a flat body with first and second sides, and an opening through the first and second sides; and
   an adjustable position element having slotted openings to attach the element to the strap at a position adjustable between the buckle slide and the buckle, the element having a post to engage the opening of the buckle body from both first and second sides, the first side to form a leash handle loop in an operative configuration and the second side to maintain a wrap of the strap around the collar in a storage configuration.

2. The improved incorporated leash/collar of claim 1 wherein the adjustable position element has a magnet to secure engagement of the metal buckle to the adjustable position element.

3. The improved incorporated leash/collar of claim 1 wherein sidewalls of the post and the opening of the buckle body are complementarily shaped for substantial engagement between the post and opening.

4. The improved incorporated leash/collar of claim 3 wherein the sidewalls of the post engaging the opening of the buckle body are crescent-shaped.

5. The improved incorporated leash/collar of claim 3 wherein the sidewalls of the post engaging the opening of the buckle body are straight.

6. The improved incorporated leash/collar of claim 3 wherein the sidewalls of the post engaging the opening of the buckle body are circular.

7. The improved incorporated leash/collar of claim 1 wherein the post has a cap lid to engage with the flat buckle body in the operative configuration.

8. The improved incorporated leash/collar of claim 1 wherein the metal buckle includes a slide allowing for play in the strap to better position the metal buckle with respect to the adjustable position element in the storage configuration.

9. The improved incorporated leash/collar of claim 1 wherein the strap includes a section of stretchable material attached to the metal buckle allowing for play in the strap to better position the metal buckle with respect to the adjustable position element in the storage configuration.

10. The improved incorporated leash/collar of claim 9 wherein the section of stretchable material comprises bungee material.

\* \* \* \* \*